May 8, 1945. H. C. WINKEL 2,375,717
GRID TRIMMER
Filed Jan. 18, 1943 5 Sheets-Sheet 1

Fig. 1.

Inventor:
Herbert C. Winkel
By: Thiess, Olson & Mecklenburger
Attys

May 8, 1945. H. C. WINKEL 2,375,717
GRID TRIMMER
Filed Jan. 18, 1943 5 Sheets-Sheet 3

Fig. 3

Inventor:
Herbert C. Winkel
By Thiess, Olson & Mecklenburger
Attys.

May 8, 1945.  H. C. WINKEL  2,375,717
GRID TRIMMER
Filed Jan. 18, 1943    5 Sheets-Sheet 5

Inventor:
Herbert C. Winkel.
By Thiess Olsen & Mecklenburger
Attys.

Patented May 8, 1945

2,375,717

UNITED STATES PATENT OFFICE 2,375,717

GRID TRIMMER

Herbert C. Winkel, Maywood, Ill.

Application January 18, 1943, Serial No. 472,733

24 Claims. (Cl. 164—22)

This invention relates to a press for trimming off excess or waste metal from grids for storage batteries.

Grids for storage batteries are ordinarily cast from lead or lead alloys. To trim off excess metal from the castings, apparatus has heretofore been proposed which involved a pusher member for sliding out the lowermost grid from an inclined stack of grids, and air operated tongs to seize the grid when it had been slid out, to swing the grid through an arc of 90°, and move it to a position above a trimming die where it is released from the tongs. A shear cooperating with the die is then moved to trim the grid plate on the die. Because of the softness of material and the irregularity of contour of the grid plates, and the complex and delicate adjustments required to maintain the machine operative, the machine is not entirely satisfactory notwithstanding its relatively great cost.

It is the object of my invention to provide a simple yet highly efficient apparatus for trimming grid plates.

It is an additional object to provide an improved device for feeding grid plates from an assembly of the same to trimming or shearing apparatus, and to move the grids in proper timed relation to and from the shearing apparatus.

A further object of my invention is to provide improved means for removing grid plates from an assembly of juxtaposed plates and deliver them one at a time to a conveyor on which they are carried edgewise into shearing position with respect to the shearing apparatus.

A further object of my invention is to provide improved means for giving the plates a step by step, edgewise movement into and out of shearing position, without interfering with the continuous reciprocation of the shear.

Further objects and advantages of the invention will in part be described hereinafter, and in part will be defined in the claims.

In the drawings, in which an embodiment of my invention is shown.

It is the present practice to cast grid plates 1 in such a way that two grids may be formed from each cast plate. Each grid is provided with an ear for making electrical connections when the grid is installed in a battery; and in the cast grid plate 1 the grids are arranged with the ears 2 (Fig. 4) extending laterally from opposite edges of the plate. In accordance with the present invention, I provide a novel arrangement of apparatus for engaging the ears of the grid plates to remove them one at a time from arrangement in face to face position, and deliver them to a step by step carrier or conveyor 3. The conveyor 3 carries them edgewise into and out of alignment with a continuously operating shear 4 for a shearing or trimming operation without interfering with the action of the shear.

Figure 1:
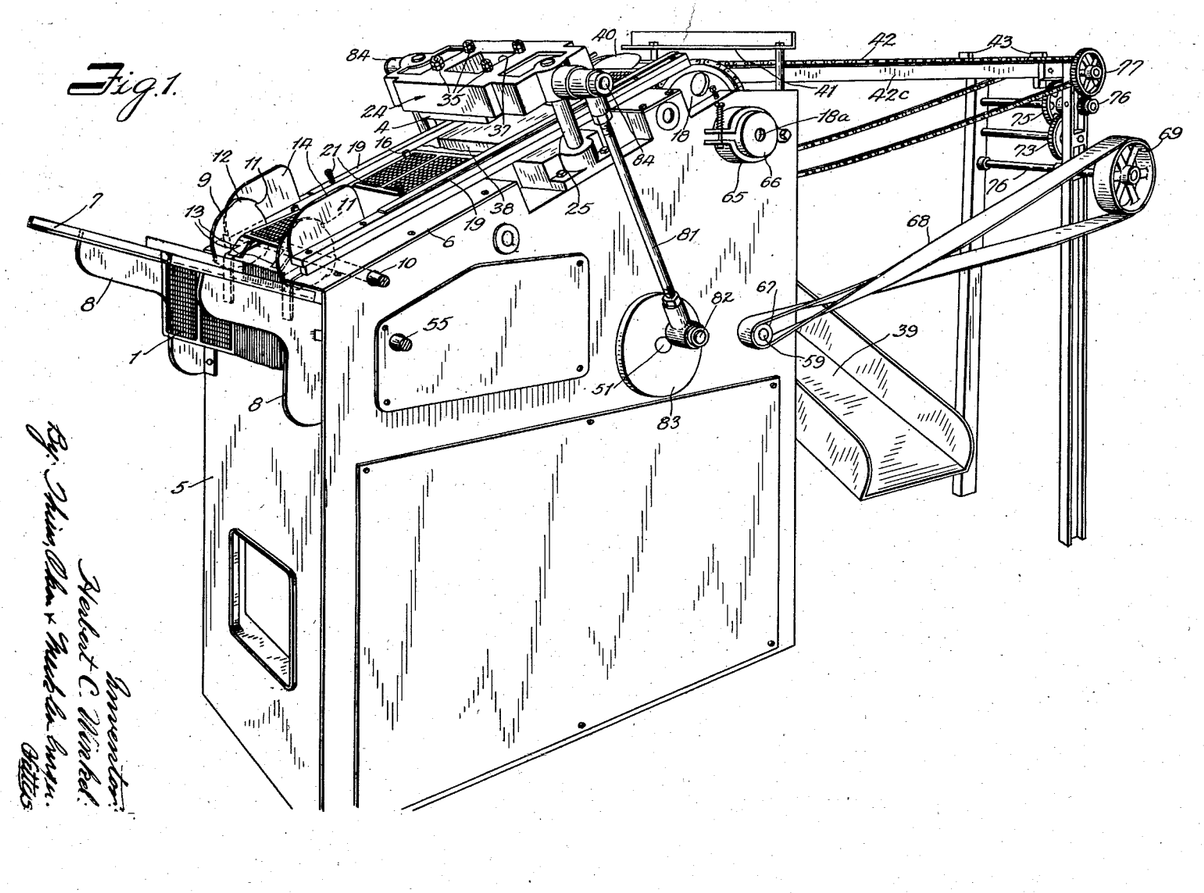
Figure 1 is a perspective view from an upper front right-hand position.
Figure 2:
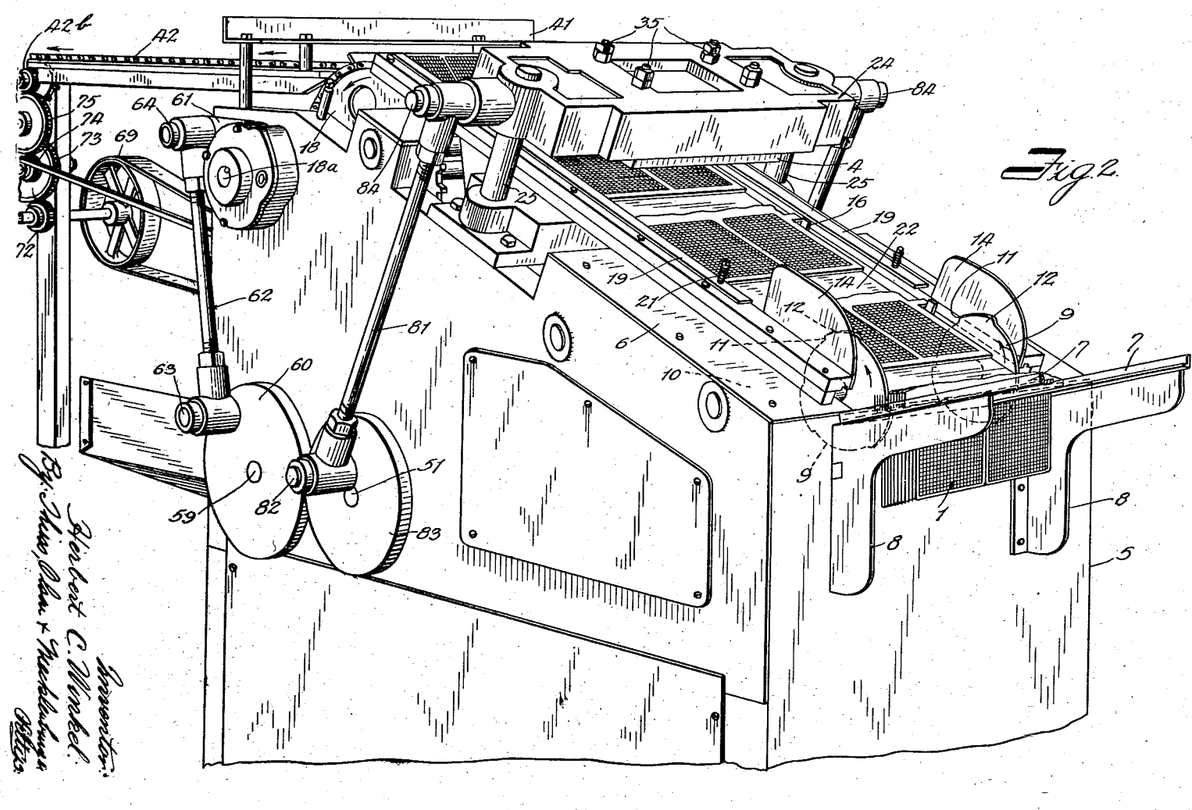
Fig. 2 is a perspective view of the apparatus from an upper front left-hand position.
Figure 3:
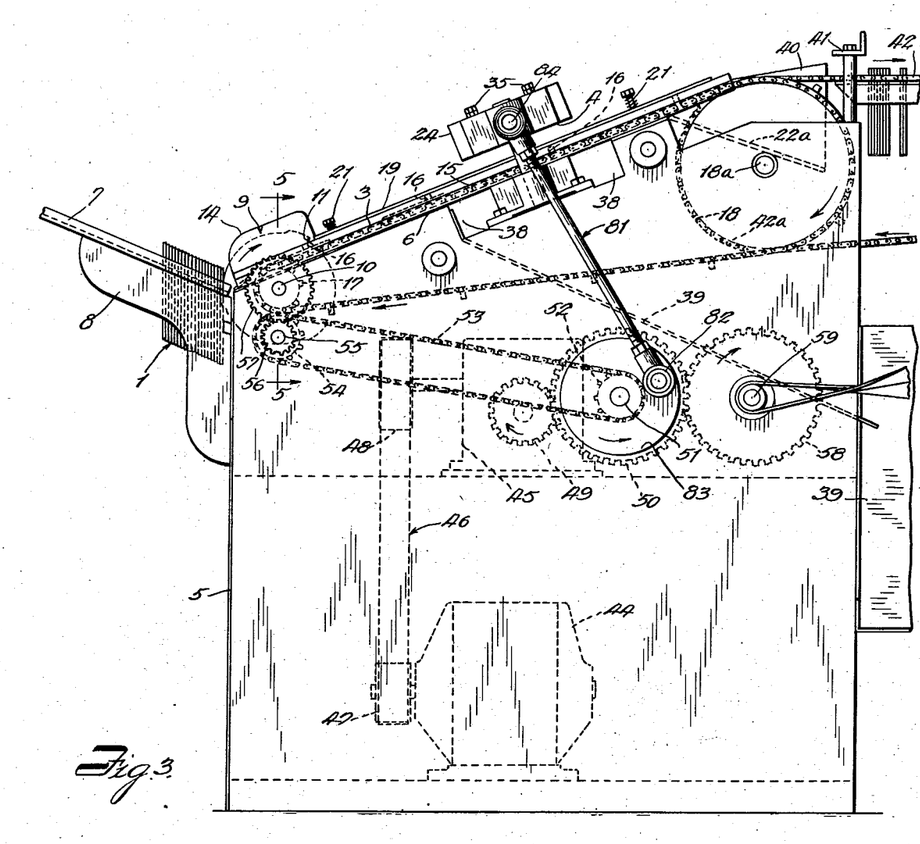
Fig. 3 is a right-hand side elevational view of the apparatus.

As shown in Figs. 1, 2, and 3, the apparatus comprises a rectangular box support or base 5 having a top surface 6 inclined upwardly from one end thereof to a short distance from the other end. At the lower end of the inclined top surface 6 a pair of rack members 7 spaced a distance somewhat greater than the width of a grid plate exclusive of the ears, and inclined downwardly towards the box support or base 5 are supported by brackets 8. A number of grid plates 1 are supported in substantially vertical position by the rack members 7 with the ears 2 of the plate resting on the upper surfaces of the members 7; and the grid plates are maintained grouped against an adjustable stop 7a at the lower end of the rack by the slope of the rack members.

Figure 4:
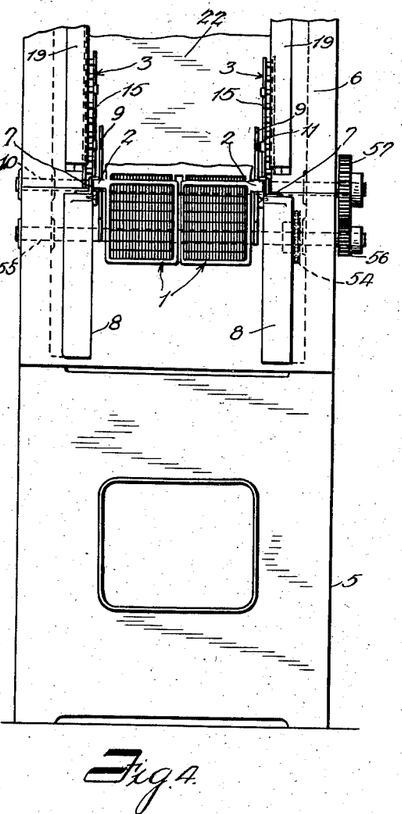
Fig. 4 is a front elevation of the apparatus.

A pair of lifting rotor members 9 are mounted on a shaft 10 journalled in the box support or base 5, and are positioned to rotate just inside the rack members 7 (see Fig. 4). The rotors 9 are provided with shoulder portions 11 on their periphery for engaging beneath the ears 2 of the lowermost grid plate 1 on the rack members 7 to move the plate upwardly from the rack members and to carry it forwardly away from the remaining plates when the rotors 9 are turned. As shown in Figs. 1, 2, and 3, the portions 12 of the rotors immediately following the shoulders 11 will bear against the ears 2 of the next succeeding plate, so that the plate will not slide down prematurely. The stops 7a prevent the grid from bearing against the lifting rotors 9, and are adjustable to operate with grids of different thicknesses. This construction insures smooth withdrawal of the plate engaged by the shoulders 11.

A pair of guide members 13 (see Fig. 1) mounted on the box support or base 5 engage the lower portion of the plate 1 carried by the rotors 9, and cause the plate to turn to position at an angle to the vertical and approaching a portion parallel to surface 6 as its upper portion is carried forward by the rotors. Upwardly extending cheek plates 14 fixed to the inclined top surface 6 engage the ears 2 of the grid plate 1 as it is carried by the rotors 9 to center the grid plate 1.

A step by step conveyor 3 comprising a pair of feed chains 15 provided with feed pins 16 is positioned with the pins at its lower end disposed to engage the ears 2 of a grid plate 1 as the plate is carried forward by the rotor members 9. Suitable timing connections, described hereinafter, are provided between the conveyor 3 and the rotors 9, so that the feed pins 16 are in a position to engage the ears 2 at the time at which the shoulders 11 of the rotors 9 have brought the grid plate 1 to a position substantially parallel to the conveyor 3; and when the feed pins 16 have engaged the ears 2, the conveyor 3 moves the plate rapidly away from the shoulders 11.

Figure 5:
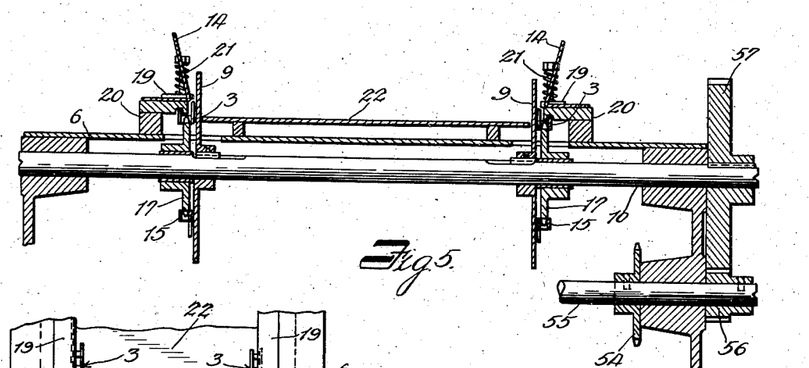
Fig. 5 is a section substantially on the line 5—5 of Fig. 3.

As best shown in Figs. 3 and 5, the conveyor or feed chains 15 run over sprocket 17 rotatably mounted on shaft 18 and sprocket 18 mounted on shaft 18a, which is journalled in base 5, and the upper flights of the chains 15 move upwardly along the inclined surface 6 of the box support or base 5 of the apparatus. Guide members 19 supported above the chains 15 by brackets 20 are pressed downwardly by means of springs 21 and serve to prevent the ears 2 of the grid plates 1 from bouncing out of engagement with the feed pins 16. The grid plate 1 is slid up along a smooth surface 22 parallel to and slightly above the inclined surface 6 of the box support 5 by the action of the feed pins 16 on the ears 2 of the grid plate 1, and is maintained in contact with the feed pins 16 in a determined position on the conveyor 3 by the force of gravity and the drag of the body portion of the grid plate 1 on the surface 22.

Figure 8:
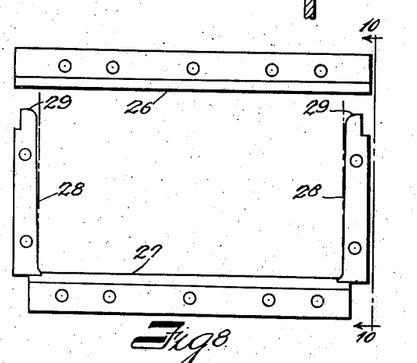
Fig. 8 is a plan view of the shearing blades.
Figure 9:
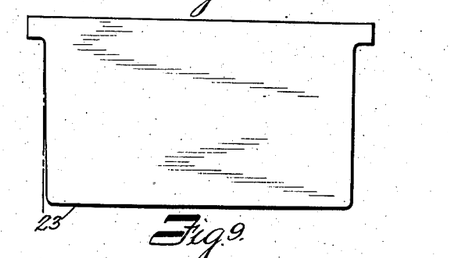
Fig. 9 is a plan view of the shearing die.
Figure 10:
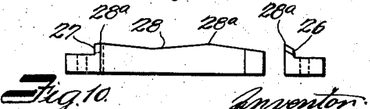
Fig. 10 is a side elevational view on the line 10—10 of Fig. 8.

A die 23 and the shear 4 (see Figs. 6 and 7) are disposed in the path along which the grid plate 1 is carried by the conveyor 3, with the die 23 substantially in line with the inclined surface 22 on which the body of the grid plate 1 is moved, and with the shear 4 mounted for cooperative relation with the die 23 in a reciprocable shear head 24 which is reciprocable on shafts 25 secured to the die plate 23. As shown in Figs. 8, 9, and 10, the die 23 has an outline corresponding to the outline to which the grid plate 1 is to be trimmed, and the shear 4 is complementary to the die. In the embodiment shown in Figs. 8 and 10, the shear 4 comprises a straight shearing edge 26 to trim the leading portion of the grid plate 1, a second straight shearing edge 27 to trim the lower portion of the grid plate 1, and shaped shearing edges 28 to trim the sides of the grid plate 1. The forward ends 29 of the side shearing members 28 are spaced a distance from the first mentioned shearing edge 26 corresponding to the width of the ears 2, and terminate at the sides at positions spaced inwardly from the chains 15 and pins 16, so that when the shear 4 is moved to trim a grid plate 1, the first mentioned shearing member 26 and the ends 29 of the side shearing members 28 come down at the sides of the ears 2, but do not interfere with the relationship between the ears 2 and the feed chains 15. The shearing edges 26, 27, and 28 trim the grid plate almost all the way around in one operation.

Suitably, the edges of the shearing members 26, 27, and 28 are at a slight angle to the line of movement of the shear 4, i. e., have leading portions 28a, as shown particularly in Fig. 10, which cut and enter the grid plate first so that shearing action is obtained, rather than a tearing action. Also, it is found these shearing members prevent excessive jolting of the die.

Figure 6:
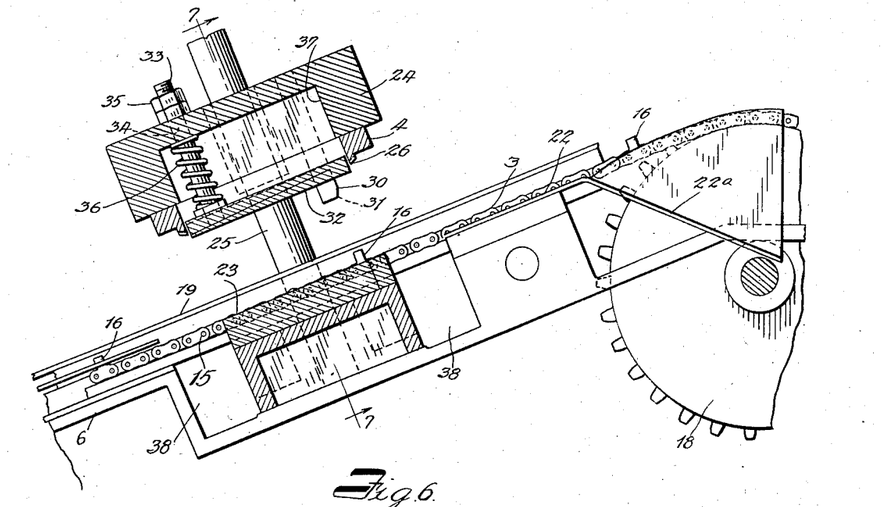
Fig. 6 is a vertical sectional view showing the shearing apparatus and associated parts.
Figure 7:
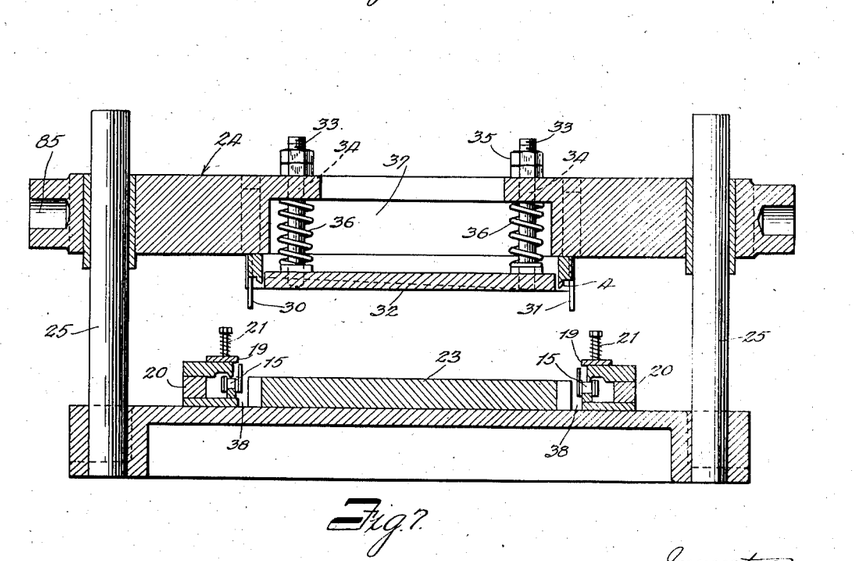
Fig. 7 is a substantially vertical sectional view on the line 7—7 of Fig. 6.

As shown in Figs. 6 and 7, the shearing head 24 is provided with positioning fingers 30 and 31, which engage the ears 2 of a grid plate 1 in order to locate it accurately for the trimming action of the shear 4. Also, a stripper plate 32 supported by bolts 33 projecting through holes 34 in the shear head 24 and lock nuts 35 on the bolts 33 and pressed downwardly by means of springs 36, is mounted in a recess 37 of the shearing head 24 and operates to strip the trimmed grid plate 1 from the shear 4 when the shearing head 24 is raised on completion of the operation.

Slots 38 are provided adjacent the edges of the die member 23, into which the material trimmed from the grid plate 1 falls, and through which it is discharged onto a chute 39.

A suitable timing connection, described hereinafter, is provided to drive the shear 4 in timed relation to the movement of the conveyor 3.

Upwardly inclined guide members 40 are provided adjacent the upper end of the surface 6 of the box support or base 5 in the path of the conveyor 3, and are formed in position as shown best in Fig. 3 to engage underneath the ears of a grid plate 1 carried by the conveyor 3 to lift the ears 2 out of contact with the conveyor 3. As the ears are lifted by members 40, the rear portion of the grid plate 1 slides down a downwardly inclined portion 22a of the surface 22, so that the grid plate 1 approaches a vertical position. The grid plate 1 is moved over the forward end of the guide members 40 by the momentum given it by the feed pins 16 of the conveyor 3, and bumps against the stop 41. The ears of the grid plate 1 then slip down through the space between the members 40 and 41 until they rest on a second conveyor 42 which is driven at a slow rate of speed. Conveyor 42 is mounted at one end on sprocket wheels 42a which are rotatably supported on shaft 18a, and at the other end on sprockets 42b. The upper flight of conveyor 42 slides on track 42c. The grid plate 1 travels the length of the second conveyor 42 and is brought up against stops 43 at the far end of the conveyor, where further movement of the grid plate 1 is prevented, and the second conveyor 42 slides underneath the ears 2 of the grid plate 1. Subsequently trimmed grid plates 1 are carried by the second conveyor 42 to a position in close engagement with previously treated grid plates 1.

Referring now particularly to Figs. 1 to 5, the timing drive device shown comprises a motor 44 located within the box support or base 5, which drives a speed reducer 45 by means of a pulley 46 running between a pulley wheel 47 on the motor 44 and a pulley wheel 48 on the speed reducer 45. A spur gear 49 of the speed reducer 45 drives a cooperating spur gear 50 mounted on a shaft 51 journalled in the base 5. A sprocket 52 mounted on the shaft 51 for rotation therewith, drives the rotor shaft 10 and rotors 9 at constant speed by means of a sprocket chain 53 running between the above mentioned sprocket 52 and a second sprocket 54 mounted on a shaft 55 journalled in the base 5 of the apparatus, and a spur gear 56 mounted on the same shaft 55 as the driven sprocket 54 cooperating with a spur gear 57 on the rotor shaft 10.

The step by step conveyor 3 is driven from the first mentioned gear 50 through a gear 58 mounted on a shaft 59 journalled in the box support or base 5, and meshing with spur gear 50, a crank disk 60 (see Fig. 2) mounted on the shaft 59 for rotation therewith, and a ratchet drive 61 reciprocated by a connecting rod 62 which is pivotally connected at one end to a pin 63 carried by the crank disk 60 and pivotally connected at its other end to a pin 64 carried by the ratchet drive device 61. The ratchet drive device 61, as it is reciprocated, rotates shaft 18a journalled in the base 5 of the apparatus while it is moving forward, but slips on said shaft 18a when it is moved backward, thus providing a periodic forward rotation of the shaft 18a. Sprocket wheels 18 supporting the forward end of the conveyor feed chains 15 are fixed on this shaft 18a and rotatable therewith, so that the feed chains 15 are moved step by step at a rate determined by the speed of the motor 44, and hence in timed relation to the rotors 9. Suitably, a spring pressed brake 65 is provided, engaging a brake drum 66 fixed to the end of the shaft 18a opposite the ratchet drive 61, in order to prevent overrunning of the feed chains 15.

A pulley member 67 is mounted on the end of shaft 59 opposite to the crank disk 60 for rotation therewith and operates through a twisted belt 68 to drive a second pulley wheel 69 mounted on shaft 70 journalled in standards 71 which support the track 42c. Gear 72 rotatable with shaft 70 operates through a gear train comprising pairs of stud gears 73 and 74, and 75 and 76, and the gear 77 mounted on shafts 78, 79, and 80, respectively, to drive sprockets 42b and move the second conveyor chains 42 on which the trimmed grid plates 1 are deposited.

The shearing head 24 is reciprocated by connecting rods 81 pivotally connected to pins 82 on crank disks 83 fixed to each end of the shaft 51 on which the gear 50 is mounted, the other ends of the connecting rods 81 being connected by pins 84 mounted at 85 in the shearing head 24. The crank discs 83 rotate at a fixed rate with respect to the rotors 9 and conveyor 3, and the shearing head 24 thus reciprocates on shafts 25 in timed relation to the rotors 9 and conveyor 3.

It will be apparent from the foregoing that the single motor 44 drives the rotors 9, the shearing head 24, and the step by step conveyor 3, so that each of them moves in timed relation to each of the others. Because of this timed relation, the feed pins 16 of the step by step conveyor 3 engage the ears 2 of the grid plate 1 at the precise moment that it is positioned for such pick-up by the rotors 9, the step by step conveyor 3 moves the grid plate 1 to position for trimming by the shear 4 during the time the shear 4 is out of the path of the grid plate 1, and the shear 4 is moved down to cooperate with the die 23 to trim the grid plate 1 while the step by step conveyor 3 is stationary. By this relatively simple mechanism, applicant has eliminated independently operated mechanisms in the trimming operation, and has provided apparatus which can be operated at high speed to give accurate trimming of grid plates.

It will be apparent that numerous modifications may be made in the apparatus of my invention without departing from the spirit thereof, and accordingly it is to be understood that the invention is not limited to the details of the apparatus disclosed, but includes all structures which as a matter of language may be held to come within the scope of the appended claims.

I claim:

1. Apparatus for trimming the edges of grid plates, which comprises a step by step conveyor movable in an upwardly inclined path for advancing a grid plate periodically in the direction of one of its edges in a predetermined position relative to said conveyor, a die and a shear cooperative to trim a grid plate moved by said conveyor, and means operating said conveyor and shear in timed relation so that the conveyor moves a grid plate to position for shearing when the shear is out of the path of the grid plates and does not move the grid plate during the shearing operation.

2. Apparatus for trimming the edges of grid plates, which comprises a conveyor periodically movable step by step in an upwardly inclined path, members on said conveyor to engage a forward portion of a grid plate and move it edgewise in a predetermined position on said conveyor so that the weight of said grid plate in its inclined position holds it firmly against said members, a die and a reciprocating shear in the path of said conveyor cooperative to trim a grid plate, and means operating said conveyor and shear in timed relation to move the conveyor forward to place the grid plate in alignment with the shear and die while the shear and die are separated, and operate the shear to trim the grid while the conveyor is stationary.

3. Apparatus for trimming the edges of grid plates which have two ears laterally extending from opposite edges, comprising a conveyor periodically movable step by step in an upwardly inclined path, members on said conveyor disposed to engage the ears of a grid plate to move it edgewise with the ears at the forward portion in a predetermined position on said conveyor so that the weight of said grid plate in its inclined position holds it firmly against said members, a die and a reciprocating shear movable in a path normal to the path of said conveyor, said shear and die being formed for cooperative operation to trim a grid plate without interfering with the relation between the ears and ear-engaging members of said conveyor, and means operating said conveyor and shear in timed relation to move the conveyor forward to place the grid plate in alignment with the shear and die while the shear and die are separated, and to operate the shear to trim the grid while the conveyor is stationary.

4. Apparatus for trimming the edges of grid plates which have two ears laterally extending from opposite edges, comprising a conveyor periodically movable step by step in an upwardly inclined path, members on said conveyor disposed to engage the ears of a grid plate to move it edgewise with the ears at the forward portion in a predetermined position on said conveyor so that the weight of said grid plate in its inclined position holds it firmly against said members, a die and a reciprocating shear movable in a path normal to the path of said conveyor, said shear having openings in positions corresponding to the ears of the grid plate and being formed for cooperative operation with said die to trim a grid plate without interfering with the relation between the ears and ear-engaging members of said conveyor, and means operating said conveyor and shear in timed relation to move the conveyor forward to place the grid plate in alignment with the shear and die while the shear and die are separated, and to operate the shear to trim the grid while the conveyor is stationary.

5. Apparatus for trimming the edges of grid plates which have two ears laterally extending from opposite edges, comprising a conveyor periodically movable step by step in an upwardly inclined path, said conveyor comprising parallel traveling portions spaced a distance at least equal to the grid plate exclusive of the ears, a smooth surface between said parallel portions on which the body of the grid plate is slidable, feed pins on said traveling portions disposed to engage the ears of a grid plate and slide it edgewise on said surface with the ears at the forward portion in a predetermined position on said conveyor so that the weight of said grid plate in its inclined position holds it firmly against said members, a die and a reciprocating shear movable in a path normal to the path of said conveyor, said shear being formed for cooperative operation with said die to trim a grid plate and having openings to avoid interfering with the relation between the ears and the feed pins of said conveyor, and means operating said reciprocating shear and conveyor in timed relation to said shear to move the conveyor forward to place the grid plate in alignment with the shear and die while the shear and die are separated, and to operate the shear to trim the grid while the conveyor is stationary.

6. In an apparatus for trimming the edges of grid plates which have two ears laterally extending from opposite edges, a rotor member to lift and carry forward one grid plate from an assembly of plates, a conveyor periodically movable step by step, and members on said conveyor movable with the conveyor to engage the ears of a grid plate when said grid plate has been carried upwardly and forwardly by said rotor member to remove it from engagement with the rotor member and hold it in a predetermined position on said conveyor.

7. In an apparatus for trimming the edges of grid plates which have two ears laterally extending from opposite edges, a rotor member, means on the rotor member to engage the ears of a grid plate to lift it and carry it forward from an assembly of plates, a conveyor periodically movable step by step, members movable with the conveyor to engage the ears of a grid plate when said grid plate has been carried upwardly and forwardly by said rotor member to remove it from engagement with the rotor member and move it edgewise in a predetermined position on said conveyor, a die, and a reciprocating shear cooperative to trim a grid plate carried by said conveyor, and means operating said rotor and conveyor and shear in timed relation.

8. In an apparatus for trimming the edges of grid plates which have two ears laterally extending from opposite edges, a rack supporting grid plates face to face, a rotor member, shoulders formed about the periphery of said rotor for engagement with the ears of the end grid plate on said rack to lift it and carry it forward, a conveyor periodically movable step by step in an upwardly inclined path, members movable with the conveyor to engage the ears of a grid plate when said grid plate has been carried upwardly and forwardly by said rotor member and move it edgewise with the ears at the forward portion in a predetermined position on said conveyor so that the weight of said grid plate in its inclined position holds it firmly against said members, and means for moving said conveyor step by step in timed relation to said rotor to move the ear-engaging members into operative relation with the ears of a grid plate when the grid plate has been carried forward and upward by the rotor.

9. Apparatus for trimming the edges of grid plates which have two ears laterally extending from opposite edges, comprising a rack supporting grid plates in face to face, substantially vertical relation, a rotor member, shoulders formed about the periphery of said rotor for engagement with the ears of the end grid plate on said rack to lift it and carry it forward, a conveyor periodically movable step by step in an upwardly inclined path, members movable with the conveyor to engage the ears of a grid plate when said grid plate has been carried upwardly and forwardly by said rotor member and move it edgewise with the ears at the forward portion in a predetermined position on said conveyor so that the weight of said grid plate in its inclined position holds it firmly against said members, a die and a reciprocating shear movable in a path normal to the path of said conveyor, said shear and die being formed for cooperative operation to trim a grid plate without interfering with the relation between the ears and the ear-engaging members of said conveyor, and means operating said rotor and said reciprocating shear at constant predetermined relative speed, and moving said conveyor step by step in timed relation to said rotor and shear to move the ear-engaging members into operative relation with the ears of a grid plate when the grid plate has been carried forward and upward by the rotor, to move the conveyor forward to place the grid plate in alignment with the shear and die while the shear and die are separated, and to operate the shear to trim the grid while the conveyor is stationary.

10. Apparatus for trimming the edges of grid plates which have two ears laterally extending from opposite edges, comprising an inclined rack supporting grid plates by their ears in face to face, substantially vertically relation, a rotor member, shoulders formed about the periphery of said rotor for engagement with the ears of the lowermost grid plate on said rack to lift it and carry it forward, a guide member for engaging a lower portion of the grid to turn the grid to an angle to the vertical when the grid is carried forwardly, a conveyor periodically movable step by step in an upwardly inclined path, feed pins carried by said conveyor to engage the ears of a grid plate when said plate has been carried upwardly and forwardly by said rotor member and move it edgewise in a predetermined position on said conveyor so that the weight of said grid plate in its alined position holds it firmly against said members, a die and a reciprocating shear movable in a path normal to the path of said conveyor, said shear and die being formed for cooperative operation to trim a grid plate without interfering with the relation between the ears and the feed pins of said conveyor, and means operating said rotor and said reciprocating shear at constant predetermined relative speed, and moving said conveyor step by step in timed relation to said rotor and shear to move the feed pins into operative relation with the ears of a grid plate when the grid plate has been carried forward and upward by the rotor, to move the conveyor forward to place the grid plate in alignment with the shear and die while the shear and die are separated, and to operate the shear to trim the grid while the conveyor is stationary.

11. Apparatus for trimming the edges of grid plates which have two ears laterally extending from opposite edges, comprising inclined rack members to support grid plates in face to face, substantially vertical position by said ears, a rotor member, shoulders formed about the periphery of said rotor for engagement with the ears of the lowermost grid plate on the rack members to raise it from the rack members and to carry it upwardly and forwardly as the rotor turns, a guide member for engaging the lower portion of the grid plate to turn the grid plate to an angle to the vertical when the grid plate is carried forwardly, a conveyor periodically movable step by step in an upwardly inclined path, said conveyor comprising parallel traveling portions spaced a distance at least equal to the grid plate exclusive of the ears, a smooth surface between said parallel portions on which the body of the grid plate is slidable members on said traveling portions disposed to engage the ears of a grid plate when said grid plate has been carried upwardly and forwardly by said rotor member to remove it from engagement with the rotor member and slide it edgewise in a predetermined position on said conveyor so that the weight of said grid plate in its inclined position holds it firmly against said members, a die and a reciprocating shear in the path of said conveyor, said shear being formed for cooperation with said die to trim a grid plate without interfering with the relation between the ears of said plate and the ear-engaging members of said conveyor, means operating said rotor and said reciprocating shear at constant predetermined relative speed, and a drive moving said conveyor step by step in timed relation to said rotor and shear to move the ear-engaging members into operative relation with the ears of a grid plate when the grid plate has been carried upward and forward by the rotor, to move the conveyor forward to place the grid plate in alignment with the shear and die while the shear and die are separated, and to hold the conveyor stationary while the shear operates to trim the grid plate.

12. Apparatus for trimming the edges of grid plates which have two ears laterally extending from opposite edges, comprising inclined rack members to support grid plates in face to face, substantially vertical position by said ears, a rotor member, shoulders formed about the periphery of said rotor for engagement with the ears of said lowermost grid plate to raise it from the rack members and to carry it upwardly and forwardly as the rotor turns, a guide member for engaging the lower portion of the grid plate to turn the grid plate to an angle to the vertical when the grid plate is carried forwardly, a conveyor periodically movable step by step in an upwardly inclined path, said conveyor comprising parallel traveling portions spaced a distance at least equal to the grid plate exclusive of the ears, a smooth surface between said parallel portions on which the body of the grid plate is slidable, members on said traveling portions disposed to engage the ears of a grid plate when said grid plate has been carried upwardly and forwardly by said rotor member to remove it from engagement with the rotor member and slide it edgewise in a predetermined position on said conveyor so that the weight of said grid plate in its inclined position holds it firmly against said members, a die and a reciprocating shear movable in a path normal to the path of said conveyor, said shear having openings in positions corresponding to the ears of the grid plate, and being formed for cooperation with said die to trim a grid plate without interfering with the relation between the ears of said plate and the ear-engaging members of said conveyor, means operating said rotor and said reciprocating shear at constant predetermined relative speed, and a drive moving said conveyor step by step in timed relation to said rotor and shear to move the ear-engaging members into operative relation with the ears of a grid plate when the grid plate has been carried upward and forward by the rotor, to move the conveyor forward to place the grid plate in alignment with the shear and die while the shear and die are separated, and to hold the conveyor stationary while the shear operates to trim the grid plate.

13. Apparatus for trimming the edges of grid plates which have two ears laterally extending from opposite edges, comprising inclined rack members to support grid plates in face to face, substantially vertical position by said ears, rotor members, shoulders formed about the periphery of said rotors for engagement with the ears of said lowermost grid plate to raise it from the rack members and to carry it upwardly and forwardly as the rotors turn, a guide member for engaging the lower portion of the grid plate to turn the grid plate to an angle to the vertical when the grid plate is carried forwardly, a conveyor periodically movable step by step in an upwardly inclined path, said conveyor comprising parallel traveling portions spaced a distance at least equal to the grid plate exclusive of the ears, a smooth surface between said parallel portions on which the body of the grid plate is slidable, members on said traveling portions disposed to engage the ears of a grid plate when said grid plate has been carried upwardly and forwardly by said rotor member to remove it from engagement with the rotor member and slide it edgewise in a predetermined position on said surface so that the weight of said grid plate in its inclined position holds it firmly against said members, a die and a reciprocating shear movable in a path normal to the path of said conveyor, said shear having openings in positions corresponding to the ears of the grid plate, and being formed for cooperation with said die to trim a grid plate without interfering with the relation between the ears and the ear-engaging members of said conveyor, means operating said rotor and said reciprocating shear at constant predetermined relative speed, and a drive moving said conveyor step by step in timed relation to said rotor and shear to move the ear-engaging members into operative relation with the ears of a grid plate when the grid plate has been carried upward and forward by the rotor, to move the conveyor forward to place the grid plate in alignment with the shear and die while the shear and die are separated, and to hold the conveyor stationary while the shear operates to trim the grid plate; an upwardly inclined guide in the path of the conveyor forward of the shear and die, said guide being formed and positioned to lift the ears of a grid plate out of contact with the ear-engaging members of said conveyor by the forward movement of the conveyor, a downwardly inclined guide plate down which the rear edge of a grid plate slides as ears are moved on the upwardly inclined guide, and a second conveyor to which the grid plates are delivered from the first mentioned conveyor and guides, driving means for said second conveyor to move said conveyor and said grid plates slowly forward, and a stop disposed in the path of said second conveyor to assemble the grid plates in face to face relation.

14. In an apparatus for trimming the edges of grid plates which have two ears laterally extending from opposite edges thereof, a die and a shear mounted for reciprocation at right angles to the plane formed by the edges of the die, the edges of said shear being formed with alternatively leading and trailing portions thereof, the portions of said edges between said leading and trailing portions being angularly disposed with respect to the plane formed by the edges of the die.

15. In an apparatus for trimming the edges of grid plates, means for enabling an assembly of substantially vertically disposed juxtaposed plates to be fed forwardly, an endless conveyor having a step-by-step belt-like movement, means for successively removing the advance plate of said assembly from said assembly and placing it in position to be advanced edgewise step by step by said conveyor, and a reciprocating shear cooperative to trim the grid plate carried by said conveyor, said conveyor having positioning means engageable with the plates carried thereby for aligning them with respect to the shear.

16. In an apparatus for trimming the edges of grid plates, an endless conveyor having a step-by-step belt-like movement and having means for engaging a plate and moving it edgewise step by step, a reciprocating shear cooperative to trim a grid plate carried by said conveyor, a second endless conveyor having a belt-like movement, and means for transferring said plates after being trimmed from said first conveyor to said second conveyor and placing them in assembled, substantially vertically-disposed juxtaposed relation to be advanced by said second conveyor, the axes of said endless conveyors being substantially parallel.

17. In an apparatus for trimming the edges of grid plates, means for feeding an assembly of substantially vertically disposed juxtaposed plates forwardly, an endless conveyor having a step-by-step movement, means for successively removing the advance plate of said assembly from said assembly and placing it in position to be advanced edgewise step by step by said conveyor, a reciprocating shear cooperative to trim the grid plate carried by said conveyor, a second endless conveyor, and means for transferring said plates after being trimmed from said first conveyor to said second conveyor and placing them in assembled, substantially vertically-disposed juxtaposed relation to be advanced by said second conveyor.

18. In an apparatus for trimming the edges of grid plates which have two ears laterally extending from opposite edges, means for enabling an assembly of substantially vertically disposed juxtaposed plates to be fed forwardly, an endless conveyor having a step-by-step movement, means for successively removing the advance plate of said assembly from said assembly and placing it in position to be advanced edgewise step by step by said conveyor by engagement with said ears, and a reciprocating shear cooperative to trim the grid plate carried by said conveyor.

19. In an apparatus for trimming the edges of grid plates which have two ears laterally extending from opposite edges, an endless conveyor having a step-by-step movement and having means for engaging the ears of a plate and moving it edgewise step by step, a reciprocating shear cooperative to trim a grid plate carried by said conveyor, a second endless conveyor, and means for transferring said plates after being trimmed from said conveyor to said second conveyor and placing them in assembled, substantially vertically-disposed juxtaposed relation to be advanced by said second conveyor by engagement with said ears.

20. In an apparatus for trimming the edges of grid plates which have two ears laterally extending from opposite edges thereof, a die and a reciprocating shear formed for cooperation with said die, an endless conveyor for carrying a plate edgewise in position for trimming said conveyor comprising two chains adjacent opposite side edges of the plate, respectively, having driving means for engaging said ears, said shear comprising shear means for trimming both side edges of the plate in the rear of said laterally-extending ears.

21. In an apparatus for trimming the edges of grid plates which have two ears laterally extending from opposite edges thereof, a die and a reciprocating shear formed for cooperation with said die, an endless conveyor for carrying a plate edgewise in position for trimming said conveyor comprising two chains adjacent opposite side edges of the plate, respectively, having driving means for engaging said ears, said shear comprising shear means for trimming both side edges of the plate in the rear of said laterally-extending ears, said reciprocating shear comprising also shear means for trimming the front and rear edges of said plate.

22. In an apparatus for trimming the edges of grid plates which have two ears laterally extending from opposite edges thereof, a die and a reciprocating shear formed for cooperation with said die, an endless conveyor for carrying a plate edgewise in position for trimming said conveyor comprising two chains adjacent opposite side edges of the plate, respectively, having driving means for engaging said ears, said shear comprising shear means for trimming both side edges of the plate in the rear of said laterally-extending ears, said side trimming shear means operating in the space between said drive means and the adjacent edge of the die in the trimming operation.

23. In an apparatus for trimming the edges of grid plates which have two ears laterally extending from opposite edges thereof, a die and a reciprocating shear formed for cooperation with said die, a conveyor for carrying a plate edgewise in position for trimming said conveyor comprising two propelling members adjacent opposite side edges of the plate, respectviely, having drive means for engaging said ears, said shear comprising shear means for trimming both side edges of the plate in the rear of said laterally-extending ears.

24. In an apparatus for trimming the edges of grid plates which have two ears laterally extending from opposite edges thereof, a die and a reciprocating shear formed for cooperation with said die, a conveyor for carrying a plate edgewise in position for trimming said conveyor comprising two propelling members adjacent opposite side edges of the plate, respectively, having drive means for engaging said ears, said shear comprising shear means for trimming both side edges of the plate in the rear of said laterally-extending ears, said side trimming shear means operating in the space between said drive means and the adjacent edge of the die in the trimming operation.

HERBERT C. WINKEL.